Sept. 21, 1943.　　　F. V. WHYLAND　　　2,330,099
TAP
Filed June 10, 1942
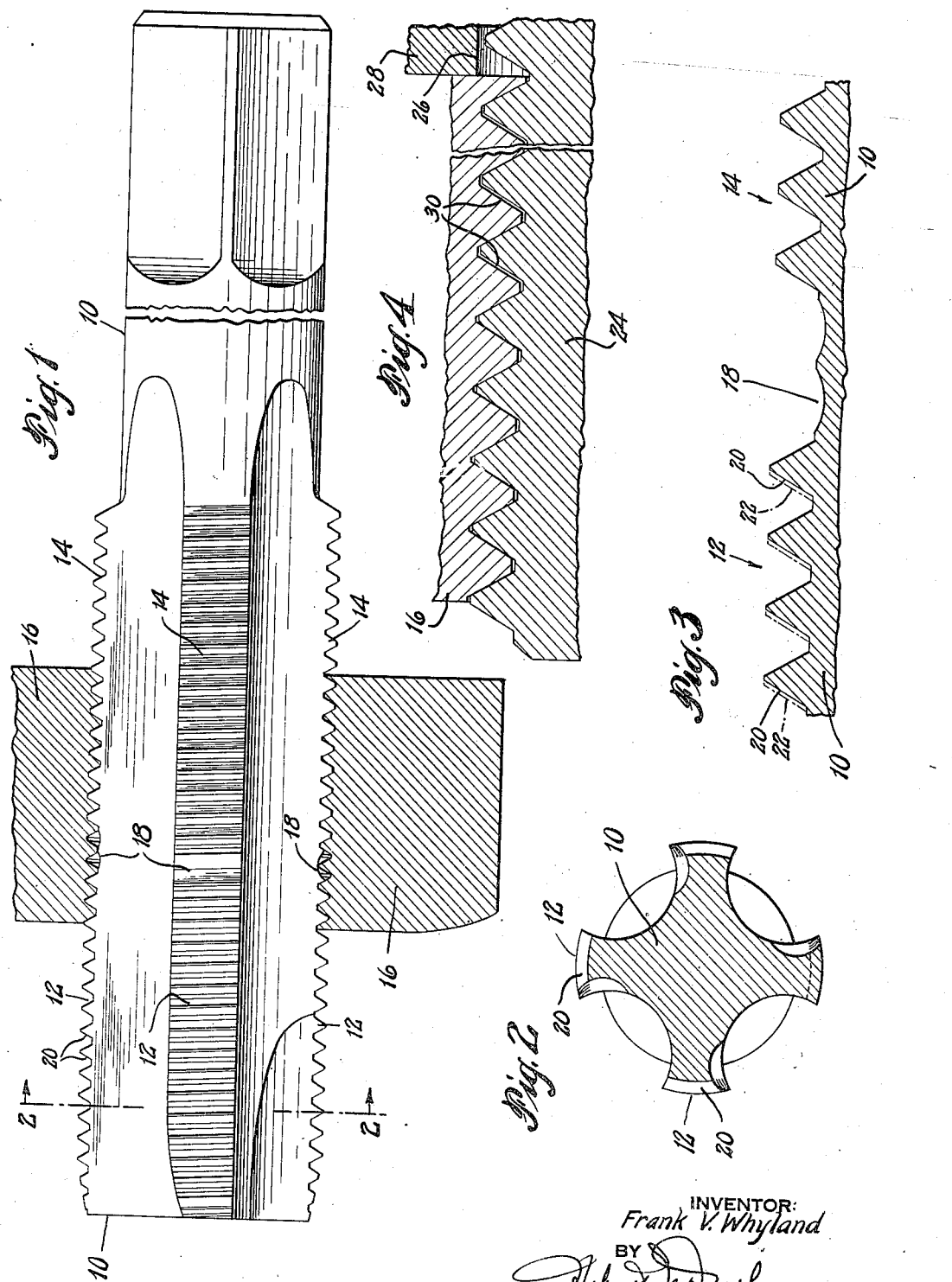
INVENTOR:
Frank V. Whyland
BY
ATTORNEY Patented Sept. 21, 1943

2,330,099

UNITED STATES PATENT OFFICE 2,330,099

TAP

Frank V. Whyland, Bronx, N. Y.

Application June 10, 1942, Serial No. 446,422

2 Claims. (Cl. 10—141)

The present invention relates to a new and improved lock nut and tap for threading the same.

Objects and advantages of the invention will be set forth in part hereinafter and in part will be obvious herefrom, or may be learned by practice with the invention, the same being realized and attained by means of the instrumentalities and combinations pointed out in the appended claims.

The invention consists in the novel parts, constructions, arrangements, combinations and improvements herein shown and described.

The accompanying drawing, referred to herein and constituting a part hereof, illustrate one embodiment of the invention, and together with the description, serve to explain the principles of the invention.

Of the drawing:

Figure 1 is a longitudinal sectional view showing typical and illustrative embodiments of the present invention;

Figure 2 is a sectional view of the tap Figure 1 and taken on the line 2—2 of Figure 1;

Figure 3 is an enlarged fragmentary view showing the cutting face of the tap; and Figure 4 is a fragmentary enlarged sectional view showing the nut of the present invention as applied to a conventional bolt.

The present invention has for its object the provision of a novel and improved lock nut, and tap for threading the nut. A further object is the provision of an improved lock nut which will fit on a standard bolt, can be threaded by a tap in a single operation, does not damage the bolt threads, and applies the strain over the full length of the engaged portion of the bolt threads. A further object is the provision of a tap for threading such a nut in a single operation.

In accordance with the present invention there is provided a tap having a standard form of thread and which is divided into two portions spaced axially from each other, the angles of both thread portions being the same, with the same pitch and pitch diameter. The leading portion of the tap thread has narrower tops than in the trailing portion, and the centers of the tops of the tap thread are displaced rearwardly of the file from the normal or uniform pitch position, thus effectively displacing the forward portions of the tap thread with respect to the rearward portion.

The threads of the nut are similarly displaced in the outer portion of the nut, the tap being passed only part way into the nut driving tapping.

It will be understood that the foregoing general description and the following detailed description as well are exemplary and explanatory of the invention but are not restrictive thereof.

Referring now in detail to the typical and illustrative embodiment of the invention as shown in the accompanying drawing, there is provided a tap 10 having threaded portions 12 and 14, shown in Figure 1 tapping the bore of a nut 16. The forward and rear portions 12 and 14 are separated by a reduced, non-threaded portion 18 which serves as a gauge to indicate how far the tap is run into the nut.

The invention may be described in connection with the formation of the tap, as follows. A standard tap 12, shown as an American Standard Thread tap, is grooved, as at 13 in Figure 3, and the forward faces 20 of the threads of the tap are cut or ground away slightly, their original shape and size being indicated by the dot-dash lines 22. The included angle of the tap thread remains the same as do the thread depth and pitch. However, the width of the thread tops is reduced, the root or bottom width is increased and the forward faces are displaced rearwardly with respect to the normal pitch, although the rear faces of the tap threads are not displaced. Exemplarily, in a ¾" tap, the amount removed from each forward face in the threaded portion 12 may be from 0.002" to 0.005".

In tapping a nut, the tap of the present invention is run into the nut bore until the reduced portion 18 is intermediate the faces of the nut 16. Thus the portion 12 has cut tight, displaced threads throughout the nut bore, while the normal portion 14 has cut only the rear portion of the nut 16.

From Figures 1 and 4, it will be seen that the nut of the present invention has tight, displaced threads at one end and normal threads at the other end.

Figure 4 shows the nut of the present invention applied to a conventional bolt 24 projecting through an aperture 26 in a plate 28, and screwed tightly against the face of the plate. As shown, the threads of bolt 24 are American standard and the nut is started on the bolt with its looser, standard threads. As the nut is tightened in place, the tighter threads fit with little or no clearance, while the standard threads of the bolt engage with the nut threads on their forward faces leaving all the clearance 30 (greatly exaggerated in the drawing) at the outer face of the threads. Thus, the tight fit of the nut at its outer end holds the nut against backing off by vibration, distributes the strain on the bolt over all of the engaged thread and greatly facilitates putting on and taking off of the nut, as a considerable portion of its bore is of normal fit.

The invention in its broader aspects is not limited to the specific mechanisms shown and described but departures may be made therefrom within the scope of the accompanying claims without departing from the principles of the invention and without sacrificing its chief advantages.

What I claim is:

1. A tap having two axially spaced threaded portions of similar pitch, diameter, thread depth and included angle, with one portion having smaller thread tops than the other portion and with the threads of one portion being slightly displaced from the threads of the other portion whereby a nut may be threaded by a single run of said tap to provide said nut with a thread that will have a tighter fit at one end thereof than at the other when threaded onto a bolt having a normal thread of said pitch and diameter.

2. A tap having two axially spaced threaded portions of similar pitch, diameter and included angle, with one portion having smaller thread tops than the other portion and with the threads of one portion being slightly displaced from the threads of the other portion whereby a nut may be threaded by a single run of said tap to provide said nut with a thread that will have a tighter fit at one end thereof than at the other when threaded onto a bolt having a normal thread of said pitch and diameter.

FRANK V. WHYLAND.